Dec. 30, 1952     K. F. MORGAN     2,623,732

PULLEY WINCH

Filed June 18, 1949     2 SHEETS—SHEET 1

INVENTOR,
Kenneth F. Morgan

Dec. 30, 1952     K. F. MORGAN     2,623,732
PULLEY WINCH
Filed June 18, 1949     2 SHEETS—SHEET 2

INVENTOR,
Kenneth F. Morgan

Patented Dec. 30, 1952

2,623,732

UNITED STATES PATENT OFFICE 2,623,732

PULLEY WINCH

Kenneth F. Morgan, Los Angeles, Calif.

Application June 18, 1949, Serial No. 100,031

11 Claims. (Cl. 254—190)

This invention relates to pulleys or pulley-winches of the block and tackle type, and particularly to a control pulley whereby a light variable tension on one end of a rope or line around the pulley controls a greater variable tension on the other end of the rope or line. It is especially applicable for controlling the sails of a boat in winds of varying velocities.

This invention is an improvement over the pulley shown in my co-pending U. S. application, Ser. No. 791,324, filed December 12, 1947, now Patent No. 2,555,501.

The present invention utilizes a single pulley having double-tensioned, pressure-controlled latching units which provide a positive locking action similar to a pawl and ratchet combination, and also a friction control between the rope or line and the pulley groove. In this manner, for very light tensions introduced in the line by the load, the control tension applied by hand is large enough to permit the proper "feel" of the light load. As the load increases, the ratio between the load tension and the hand control tension varies at a different rate, so that at all times, not only is the hand capable of controlling or handling the increased load; but, when the load decreases, the operator does not lose precise control of the load because of the same disproportionate ratio therebetween.

Thus, for use in yacht or boat racing, a single pulley, similar in size, weight, and construction to present boat hardware, around which the control line passes, will provide the "skipper" not only with the ability to control the sail in heavy winds without danger of lock up, but it will also give him the necessary control in light winds. Under light wind conditions, the pulley must allow the sail to pay out or be hauled in freely with minimum friction, in the manner of any free-running pulley. When the wind becomes heavier, it is desirable to relieve the strain on the skipper's hand and arm in the holding position; but, at the same time, he must be able to readily trim sail either in or out, and in the case of an emergency, be able to immediately spill the wind out of the sail by letting the sheet out rapidly.

The principal object of the invention, therefore, is to facilitate the handling of a variable load on a line or rope.

Another object of the invention is to provide an improved pulley-winch which permits control of the rotation thereof in accordance with the pull on the other end of a line passing thereover.

A further object of the invention is to provide a novel ratchet for a pulley-winch for boat sails, which is capable of not only locking the pulley at predetermined tensions, but which controls the friction of the line or rope passing thereover.

A still further object of the invention is to provide a pulley-winch which provides a variable control tension which varies at one predetermined desirable rate with respect to the load tension over a certain range of load tensions, and at another predetermined desirable rate over another certain range of load tensions.

Although the novel features which are believed to be characteristic of this invention will be pointed out with particularity in the appended claims, the manner of its organization and the mode of its operation will be better understood by referring to the following description, read in conjunction with the accompanying drawings, forming a part hereof, in which:

Figure 1:
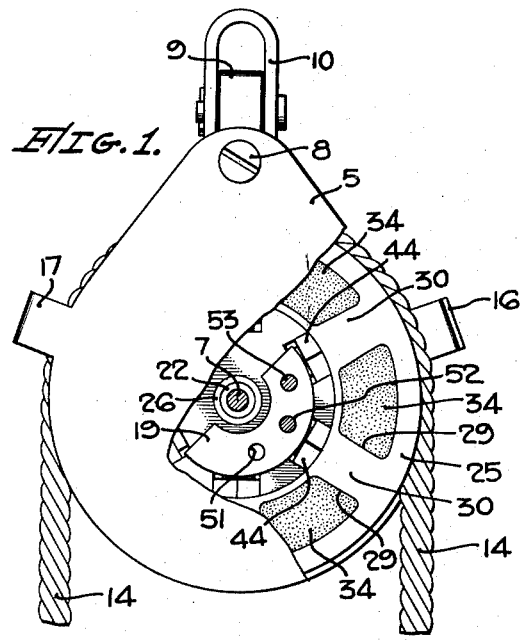
Fig. 1 is a side view, partially cut away, of a pulley embodying the invention.
Figure 2:
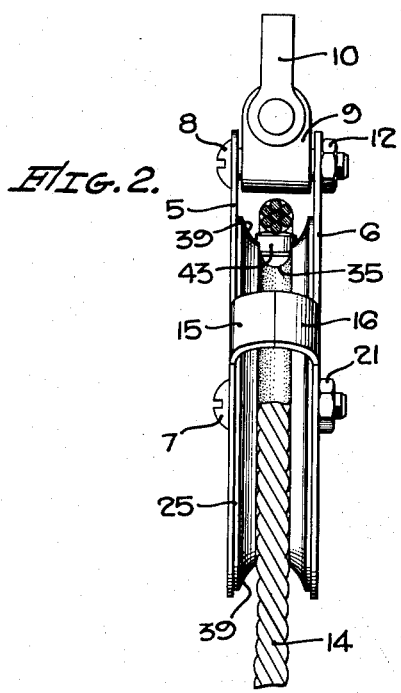
Fig. 2 is an edge view of the pulley shown in Fig. 1.

Referring now to the drawings, in which the same numerals identify like elements, the pulley has a pair of housing plates 5 and 6 substantially circular with ear portions through which a bolt 8 passes for holding a coupling 9 and a clevis 10 combination, the bolt being held in position by a nut 12. Guides for a rope or line 14 are formed on each of the side plates 5 and 6, as shown at 15, 16, 17, and 18. Mounted opposite one another on each of plates 5 and 6, are semi-circular ratchet teeth, such as shown at 19 and 20.

The pulley is mounted on a bolt shaft 7 having nut 21, on which is a spacer sleeve 22 to prevent plates 5 and 6 from binding the pulley when the nut 21 is tightened. The pulley is composed of a central or inner section 24 and an outer ring section 25, which are fastened together by screws 49 (see Fig. 7). The outer ring section has six hollow spokes 30, the cylindrical openings therein continuing through the inner section 24, the outer portions of the holes in section 24 being cut through to form slots or notches, as shown at 31. A sleeve 26 forms a hub for the pulley. Rubber 34 is molded and bonded between the spokes 30 to the sides of openings 29 through the outer ring section 25. The rubber and the outer ends of the spokes are turned to form a groove in the pulley for the rope 14, as shown at 39 in the spokes 30 and at 35 and 36 in the rubber 34. (See Figs. 6 and 7.) Since the ring 25 is made by cutting through its outer rim to the rubber, the sides of the rim will be slightly tapered, as shown at 39, there being slight shoulders between the rim and rubber tapers. The radius of the groove is slightly smaller than that of the rope 14 to be used with the pulley. When the rope is in contact with the rubber, it will be tightly gripped thereby in accordance with the tension in the rope.

Figure 3:
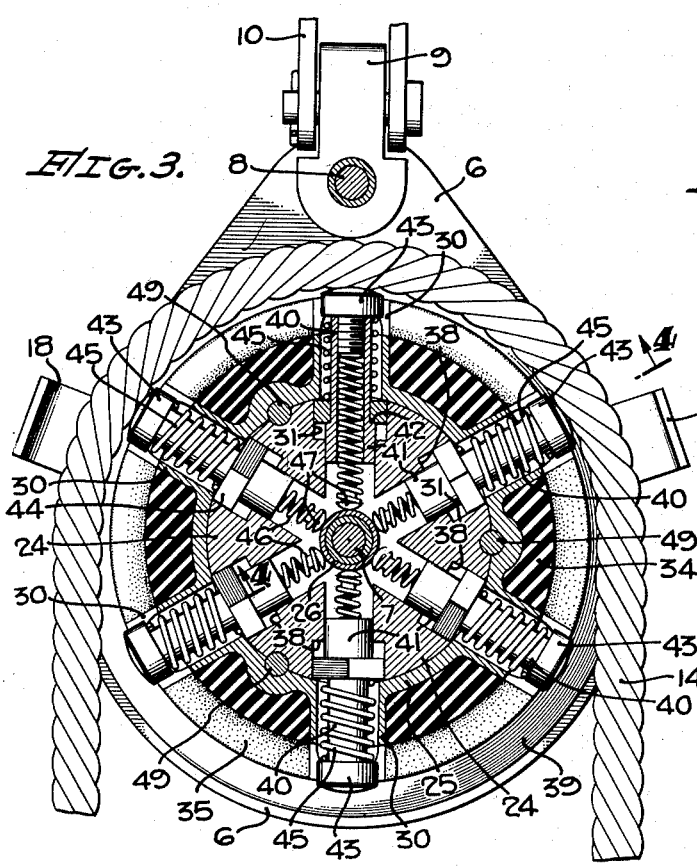
Fig. 3 is a cross-sectional view of the pulley showing the latching elements.
Figure 4:
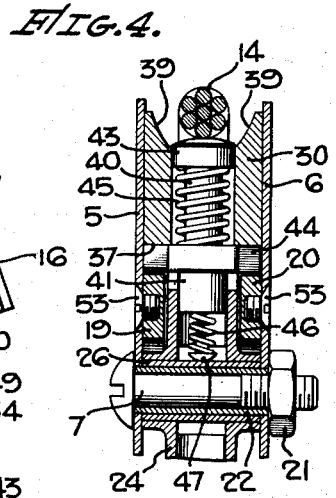
Fig. 4 is a partial detailed view, taken along the line 4—4 of Fig. 3.
Figure 8:
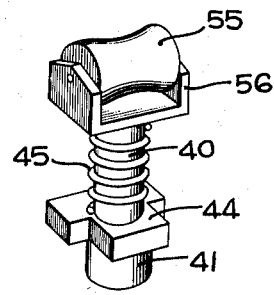
Fig. 8 is a perspective view of a modification of a portion of one of the latching units.

Referring now to the latch mechanism within the spokes 30, there is first provided cylindrical sleeves 40 having enlarged diameter sections 41 to provide shoulders 42. (See Fig. 6.) Cap screws 43 are threaded within the sleeves 40, and, positioned between the caps 43 and T-shaped pawl elements 44 (see Fig. 8), are coil springs 45, which normally hold the pawls 44 in contact with shoulders 42. Within the shell sections 40 and 41, are coil springs 46 having round headed contact elements 47, which contact the hub 26 of the pulley. Normally, without tension on either end of the rope 14, the rope rests on the heads of the caps 43, as shown in Figs. 3 and 4, the rope being practically held out of contact with the rubber 34. At this time, the springs 45 and 46 are both expanded, springs 46 holding the pawls 44 and caps 43 in their extreme radial positions. These positions are determined by the contact of pawls 44 with the shoulders 37 on the outer ring section 25, while the other limiting positions of the pawls are determined by the inner shoulders 38 of the notches 31.

Figure 5:
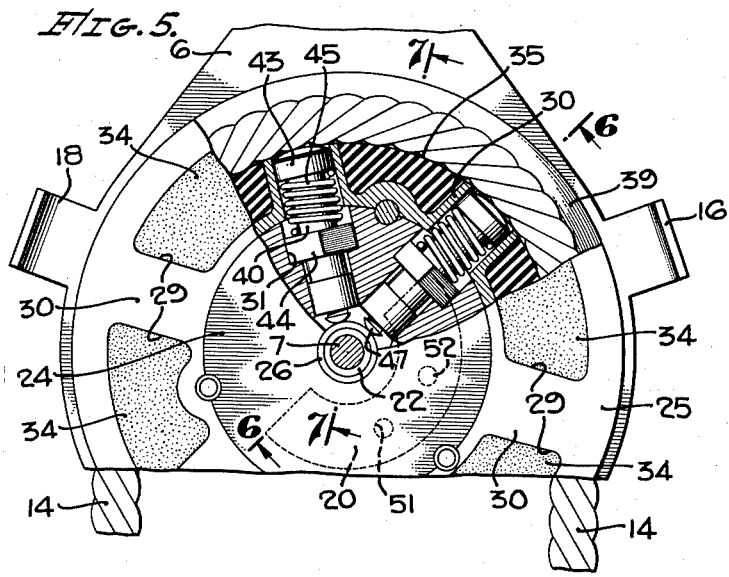
Fig. 5 is an enlarged sectional view showing certain latches in locked position.
Figure 6:
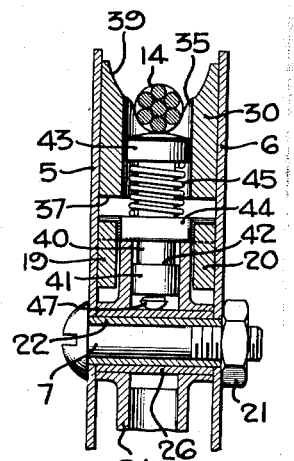
Fig. 6 is a detailed view taken along the line 6—6 of Fig. 5.
Figure 7:
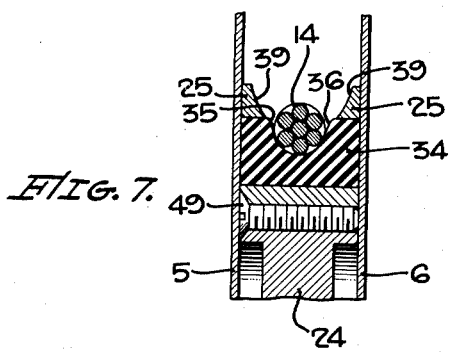
Fig. 7 is a detailed view taken along the line 7—7 of Fig. 5.

Now, when a certain amount of tension is applied to the rope, the caps 43 of the latches in contact with the rope will be compressed, as shown in Figs. 5 and 6, which first compresses spring 46 to move the pawls 44 toward the center of the axis of the pulley and against the inner shoulders 38 of the notches 31. This movement will bring the pawls 44 in contact with one end of ratchet elements 19 and 20 (see Figs. 1 and 4) to lock the pulley to the side plates 5 and 6 and prevent rotation thereof in the direction of the load tension. A tension or pull on the other end of the rope greater than the load tension will permit the pulley to rotate freely in the direction of the pull. This is because the pawls 44 cannot make contact with the other ends of the ratchet elements 19 and 20, since the latches in the diametrically opposite positions are not in contact with the rope 14, and are thus not retracted or compressed. Any pawls compressed by the rope so they contact the back of the ratchet elements will not lock the pulley. As shown in the figures, the rope has a wrap or contacts the pulley over approximately fifty percent of its diameter, or 180 degrees. If the pulley is used where the rope 14 is wrapped over an angle of approximately ninety degrees, the ratchets may be shifted approximately forty-five degrees to the right, by the provision of the extra hole 51 (see Fig. 1), in which one of the fastening screws 52 and 53 would be placed. Since the pulley will swing slightly in the direction of the load, this amount of position shift is proper for the ratchet elements.

Figure 9:
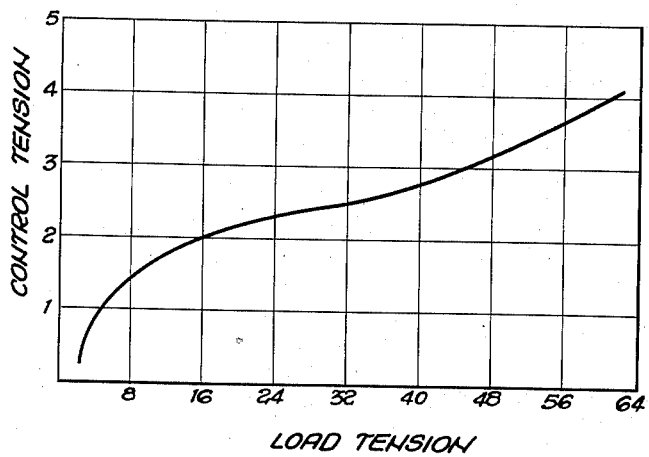
Fig. 9 is a graph showing the varying relationship between the control and load tensions.

To provide a smoother action of the rope over the cap elements, the cap elements 43 may be replaced by grooved rollers 55 mounted in yokes 56 threaded into the cylinders 40. To illustrate the actual relationship between the load tension and the control tension of a rope around a pulley, reference is made to Fig. 9, where it will be noted that, for light load tensions, the control tension is substantially proportional thereto, whereas, as the load tension increases, the amount of control tension required for heavier loads decreases rapidly. The operator thus has the necessary "feel" of the load at all times, together with the ability to control large loads with light tensions.

The above pulley construction differs from the pulleys disclosed and claimed in my co-pending application, above mentioned, by providing a single normal sized pulley with built-in ratchet and selective load control. That is, in the present construction, light load tensions are insufficient to move the pawl elements 44 to pulley locking position so that the pulley may rotate freely in either direction in the same manner as a normal pulley. The pulley can either rotate or the rope slip over the latch caps. As the load increases, the caps in contact with the rope move the cylinders 40 and 41 and pawls 44 toward the axis of the pulley until some one of the pawls makes contact with the ratchet elements 19 and 20. This action not only locks the pulley to the side plates, but brings the rope into a certain frictional contact with the rubber 34. Thus, the pulley cannot rotate in the direction of the load and the friction between the rope and rubber permits a light hand pull to hold an intermediate load. Upon greater tension in the rope, produced by heavier loads, the springs 45 are also compressed (see Fig. 6), and greater friction exists between rope and rubber to permit easier holding of the greater loads. It is similar in some respects to wrapping more turns of a rope around a fixed capstan. However, should the operator desire to pull in the load, regardless of its size, the pulley will freely rotate in the reverse direction, since the pawls will only contact the backs of the ratchets 44 after they have passed the ends thereof and then slip over them.

Now, as the hand tension is decreased, the springs 45, in cooperation with springs 46, since both springs act on caps 43, first lift or peel the rope from the rubber to reduce the friction therebetween, causing slippage, until the pressure on the latches is low enough for the springs 46 to remove the pawls 44 from the ratchets 19 and 20, after which the pulley can run freely in the direction of the load tension. The spring 46 thus controls the locking action, while the spring 45, together with spring 46, control the friction between rope and pulley and the pawl operation. Thus, the operator has complete control of a wide range of load tensions, without danger of lock-up, in spite of high braking efficiency, which is particularly desirable where the sails of boats are being handled by hand ropes.

I claim:

1. A pulley construction, comprising a pair of side plates, a pulley rotatably mounted therebetween, ratchet elements on said plates, a plurality of equally spaced radially positioned latching units on said pulley, a line around said pulley, and resilient means included in said latching units for controlling the making and releasing contact between certain of said units and said ratchet elements in accordance with the tension in said line, said means controlling the degree of contact between said line and said pulley in accordance with the controlling tension in said line.

2. A pulley construction, comprising a pair of side plates, a shaft at substantially the center of said plates, a pulley mounted for rotation on said shaft, a line around said pulley, said pulley having side sections and a plurality of spoke sections, latching units mounted within said spoke sections, ratchet elements mounted on said side plates, said latching units being adapted to contact said ratchet elements upon line pressure on said units toward the axis of said pulley, and resilient means for releasing said latching units upon a predetermined reduction of pressure thereon, said resilient means also controlling the degree of friction between said side sections of said pulley and said line in accordance with the controlling tension in said line.

3. A pulley constructed in accordance with claim 2, in which said latching units include line contact elements, a pair of springs in each unit urging said contact elements away from the axis of said pulley, and pawl elements, one of said springs of each pair controlling the movement of said pawl elements and both of said springs controlling the contact of said line with said pulley.

4. A pulley construction in accordance with claim 2, in which said latching units include cylinders having radial axes, internal and external springs for said cylinders, pawls on said cylinders and line contact elements on said cylinders, pressure on said contact elements by said line first compressing said internal springs to permit contact of said pawls with said ratchet elements, and secondly compressing said external springs to control the contact of said line with said pulley.

5. A pulley-winch comprising means for supporting a pulley, a pulley supported by and rotatable on said supporting means, fixed means on said supporting means for preventing rotation of said pulley in one direction and permitting rotation of said pulley in the opposite direction, control means resiliently mounted on said pulley for contacting said fixed rotation preventing means, and a line over said pulley, said line being in contact with certain of said control means at any one time, the degree of tension in said line and the resiliency of said resiliency mounted control means determining when contact occurs between said rotation preventing means and said control means on said pulley cooperating therewith, the resiliency of said resiliently mounted control means also determining the degree of contact between said line and said pulley.

6. A pulley-winch in accordance with claim 5, in which said pulley includes a liner for contacting said line and increasing the friction between said line and said pulley as the controlling tension increases in said line.

7. A pulley-winch in accordance with claim 5, in which said pulley has spokes, said spokes containing said resiliently mounted control means including resiliently mounted pawls, a predetermined pressure of said line on certain of said control means bringing certain of said pawls into contact with said rotation preventing means on said pulley supporting means.

8. A pulley-winch in accordance with claim 5, in which said rotation preventing means are ratchets on said pulley supporting means and said control means are cylinders having radial axes, line contact elements, springs internal and external of said cylinders, and pawls adapted to be moved into contact with said ratchets by a predetermined pressure on said line contact elements to overcome the tension of said springs.

9. A pulley-winch, comprising a pair of side supporting plates, a shaft therebetween, a pulley mounted and rotatable on said shaft, ratchet elements on said plates, a line around said pulley, and spokes for said pulley having line contacting elements, said spokes containing pawls connected to and actuated by said line contacting elements for moving said pawls into contact with said ratchets when pressure is applied to said line contacting elements by tension in said line.

10. A pulley-winch in accordance with claim 9, in which said pulley includes friction producing means for said line, and said line contacting elements are resiliently mounted for controlling the friction between said line and friction producing means in accordance with the resiliency of said mounting and the controlling tension in said line.

11. A pulley-winch for permitting varying loads on one end of a line around said pulley-winch to be controlled by varying tensions on the other end of said line, comprising a pulley always rotatable in the direction of the control end of said line and selectively rotatable in the direction of the load end of said line, fixed plates for supporting said pulley, a line around said pulley, said pulley-winch including equally spaced radially positioned latching units for locking said pulley against rotation in the direction of the load at a predetermined tension in said line, said units including fixed ratchets on said supporting plates and radially movable pawls on said pulley for contacting said ratchets, and resiliently mounted means contacting said line and said pawls for controlling the friction between said line and said pulley when said pulley is locked against rotation in the direction of the load, the resiliency of said resiliently mounted means also controlling the movement of said pawls toward said ratchets.

KENNETH F. MORGAN.

REFERENCES CITED

The following references are of record in the file of this patent:

UNITED STATES PATENTS

| Number | Name | Date |
|---|---|---|
| 565,241 | Starr | Aug. 4, 1896 |
| 643,461 | Bischoff | Feb. 13, 1900 |
| 785,139 | Wilhelmi | Mar. 21, 1905 |
| 811,440 | Roberts | Jan. 30, 1906 |
| 848,905 | Jensen | Apr. 2, 1907 |
| 861,707 | Cain | July 30, 1907 |
| 1,356,363 | Hilgers | Oct. 19, 1920 |
| 1,732,942 | Martinson et al. | Oct. 22, 1929 |
| 2,079,054 | Vadasz | May 4, 1937 |

FOREIGN PATENTS

| Number | Country | Date |
|---|---|---|
| 691,626 | France | July 15, 1930 |